United States Patent [19]

Pfaffmann

[11] Patent Number: 5,117,613
[45] Date of Patent: Jun. 2, 1992

[54] INDUCTION HEATING AND PACKAGE SEALING SYSTEM AND METHOD

[75] Inventor: George D. Pfaffmann, Farmington Hills, Mich.

[73] Assignee: Tocco, Inc., Boaz, Ala.

[21] Appl. No.: 683,611

[22] Filed: Apr. 11, 1991

[51] Int. Cl.5 .......... B65B 51/22; B65B 7/28; B65B 5/02; H05B 6/10
[52] U.S. Cl. .................. 53/478; 53/329.3; 53/DIG. 2; 156/69; 219/10.53; 219/10.77
[58] Field of Search ............ 53/478, 329.3, 329.4, 53/374.6, 374.8, DIG. 2; 156/69, 272.2, 272.4, 359.379.6, 379.8, 380.2, 380.6; 219/10.53, 10.77, 10.41

[56] References Cited

U.S. PATENT DOCUMENTS

| | | | |
|---|---|---|---|
| 2,764,862 | 10/1956 | Rado | 53/374.8 |
| 3,817,801 | 6/1974 | Widmer | 156/69 |
| 3,925,139 | 12/1975 | Simmons | 53/374.8 X |
| 3,930,041 | 12/1975 | Komatsu et al. | 53/478 X |
| 4,075,818 | 2/1978 | Wright et al. | 53/374.8 X |
| 4,199,672 | 4/1980 | Sword et al. | 219/10.53 X |
| 4,246,461 | 1/1981 | Jeppson | 156/69 X |
| 4,523,068 | 6/1985 | Lund et al. | 219/10.53 |
| 4,707,213 | 11/1987 | Mohr et al. | 53/329.3 X |
| 4,897,518 | 1/1990 | Mucha et al. | 219/10.77 X |
| 4,984,414 | 1/1991 | Pfaffmann et al. | 53/478 |

*Primary Examiner*—Horace M. Culver
*Attorney, Agent, or Firm*—Body, Vickers & Daniels

[57] ABSTRACT

An induction heating package sealing system includes a control which applies full power to an inductor of a first period and reduces power gradually for a second period. A seal temperature profile gradually approaching a temperature goal is thereby achieved which provides for a more uniform seal.

22 Claims, 4 Drawing Sheets

INDUCTION HEATING AND PACKAGE SEALING SYSTEM AND METHOD

This invention relates to the art of closures for containers and more particularly to an apparatus and method for sealing food packages by means of induction heating.

BACKGROUND OF THE INVENTION

Food packaging has changed radically over the last 50 years. These changes have allowed manufacturers to market food products to consumers in new forms. Entire new categories, such as frozen prepared foods, refrigerated prepared foods and packaged shelf stable prepared foods have been created. These new product types are sold in very large numbers as consumer items in a national marketplace. They require packages and sealing techniques usable in a mass production environment which are inexpensive and reliable.

The products described are produced at large plants for distribution over large areas. Of necessity, these plants prepare and package very large numbers of products in an automated manner with the automated equipment running continuously at a very high production rate. With respect to packaging, such a production system requires that containers with a prepared food product be handled by an automatic closure machine which applies a closure, seals the closure to the container and delivers the closed container to a boxing station or the like in a repetitive, high rate manner. Reliability is very important in such an operation.

Sealed plastic containers are one form of packaging which has grown very rapidly over the last several years. Such containers are used for a wide variety of foods including shelf stable prepared foods. Often, it is necessary to assure a complete seal between the container and its closure which will remain tight during shipping and marketing, but be easily opened by the consumer. Such sealing between a closure and a container is not easily achieved in the high production rate automated packing lines prevalent in the modern food industry.

Another aspect of the modern food industry is the rapidity with which food products are changed. Recipes are updated regularly, product lines are changed to cater to consumer tastes and package sizes and shapes are changed. A food company must maintain versatility of manufacturing technique in order to stay competitive.

The achievement of a complete seal between a package and closure reliably in the above-described setting has been a problem. One method of obtaining a seal uses induction heating of the area to be sealed. A food filled package of tray shape is positioned in the sealing appliance. A closure or lid is placed on top of the package in its final position. Either the closure or the container is provided with a band of conductive material defining the area in which a seal is to be created. Often, this conductive material is a band of aluminum around the periphery of the closure. A band of hot melt adhesive may be added over the aluminum. An induction heating fixture is brought into close proximity or contact with the assembled container and closure and energized. An electric current is induced in the conductive aluminum band, heating the closure and/or container where a seal is desired to a point where these plastic elements or the adhesive liquify sightly. The container and closure are thereby cohesively bonded, adhesively bonded or welded together. One such induction heating food package sealing apparatus is described in U.S. Pat. No. 4,707,213 to Mohr et al.

While the above-described process has achieved success in many respects, problems still exist. Variations in positioning of the container and/or closure at the induction sealing station can cause variations in the seal. Slight defects in the application of the aluminum conductive material can cause local variations in heating and therefore variations in the seal. Other factors such as misalignment between the inductor and the aluminum band and the like also cause local variations in the sealing of a closure to a package. This can cause some inconsistencies in sealing of packages.

These and other problems are overcome by the present invention wherein a method and apparatus for improved control of induction heating and package sealing is provided.

SUMMARY OF THE INVENTION

In accordance with the present invention there is provided an induction heating package sealing system in which the power provided to the sealing inductor is controlled to rapidly achieve a maximum heating effect at the initiation of a cycle and then decreased during the cycle in a gradual manner.

Further in accordance with the invention there is provided an induction heating package sealing system in which the power to the inductor in each sealing cycle is maintained at maximum power for an initial portion of said cycle and then decreased in a controlled manner from maximum power to a reduced power level during the letter portion of the cycle.

Still further in accordance with the invention there is provided an induction heating package sealing method and apparatus in which the power to the inductor is controlled to achieve a selected temporal temperature profile adjacent a conductive band within a package and closure assembly wherein the temperature profile comprises a first portion in which the temperature of the seal area rises rapidly at a generally constant rate and a second temperature profile portion in which the temperature rises asymtotically toward a temperature goal.

Still further in accordance with the invention the temperature of the zone to be heated is initially monitored and energy to the inductor is controlled responsive to the monitored temperature to achieve the desire temporal temperature profile or the temporal temperature profile is developed empirically.

The primary object of the present invention is to provide a method and apparatus for inductively heating and sealing packages which achieves heating and sealing rapidly, uniformly and inexpensively in automated sealing lines.

It is another object of the present invention to provide an apparatus and method of inductively heating and sealing packages which provides a more uniform seal from package to package.

It is yet another object of the present invention to provide a method and apparatus for inductively heating and sealing packages which heats the zone on the package to be sealed in a controlled manner to a selected temperature only without overheating.

It is still another object of the present invention to provide an apparatus and method of inductively heating objects rapidly yet controlling the final heat temperature precisely.

It is another object of the present invention to increase the rate of energy input into the seal zone to obtain a shorter cycle time.

These and other objects and advantages of the invention will become apparent from the following description of a preferred embodiment thereof taken together with the accompanying drawings.

BRIEF DESCRIPTION OF THE DRAWINGS

The invention may take physical form in certain parts and arrangements of parts, a preferred embodiment of which is described in detail below and illustrated in the accompanying drawings which form a part hereof and wherein.

DETAILED DESCRIPTION OF THE PREFERRED EMBODIMENT

Figure 1:
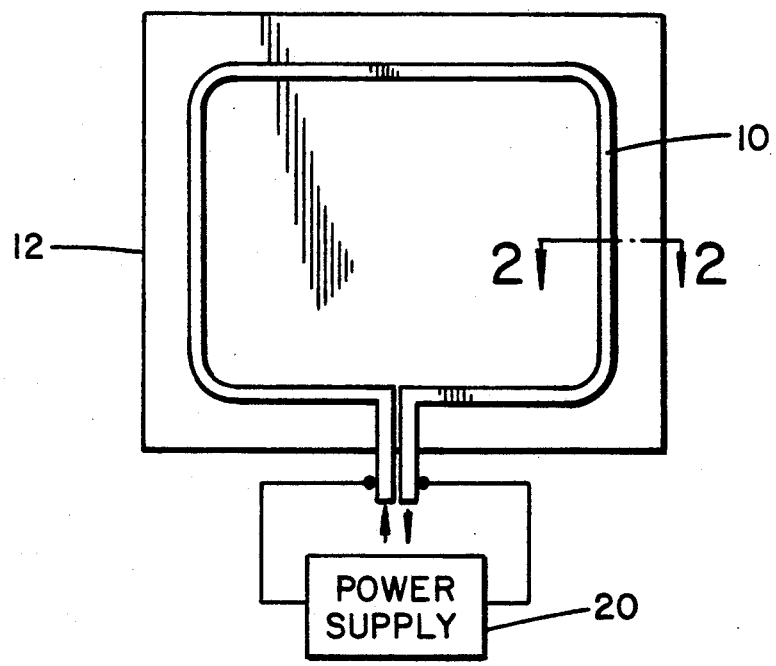
FIG. 1 is a schematic plan view of an apparatus employing the present invention.

Referring now to the drawings wherein the showings are made for the purposes of illustrating a preferred embodiment of the invention only and not for the purposes of limiting same, FIG. 1 shows an inductor 10 supported on a fixture 12. The general construction of this fixture and the support for the inductor 10 is known in the prior art. One such arrangement is described in detail in U.S. Pat. No. 4,707,213 to Mohr et al. which issued on Nov. 17, 1987. The inductor 10 is shaped and sized to correspond with the zone on a package in which sealing is to take place. Again, the shaping of the inductor coil to achieve a particular seal shape is a technique known in the art.

Figure 2:
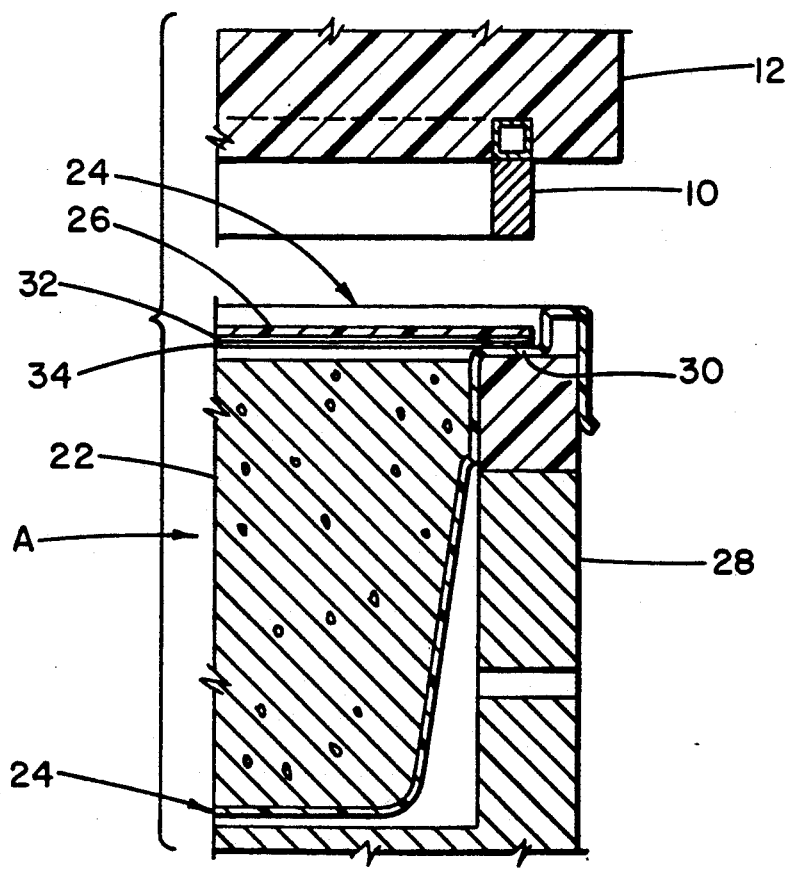
FIG. 2 is a cross section taken along line 2—2 of FIG. 1 showing a food container and closure about to be sealed.
Figure 2A:
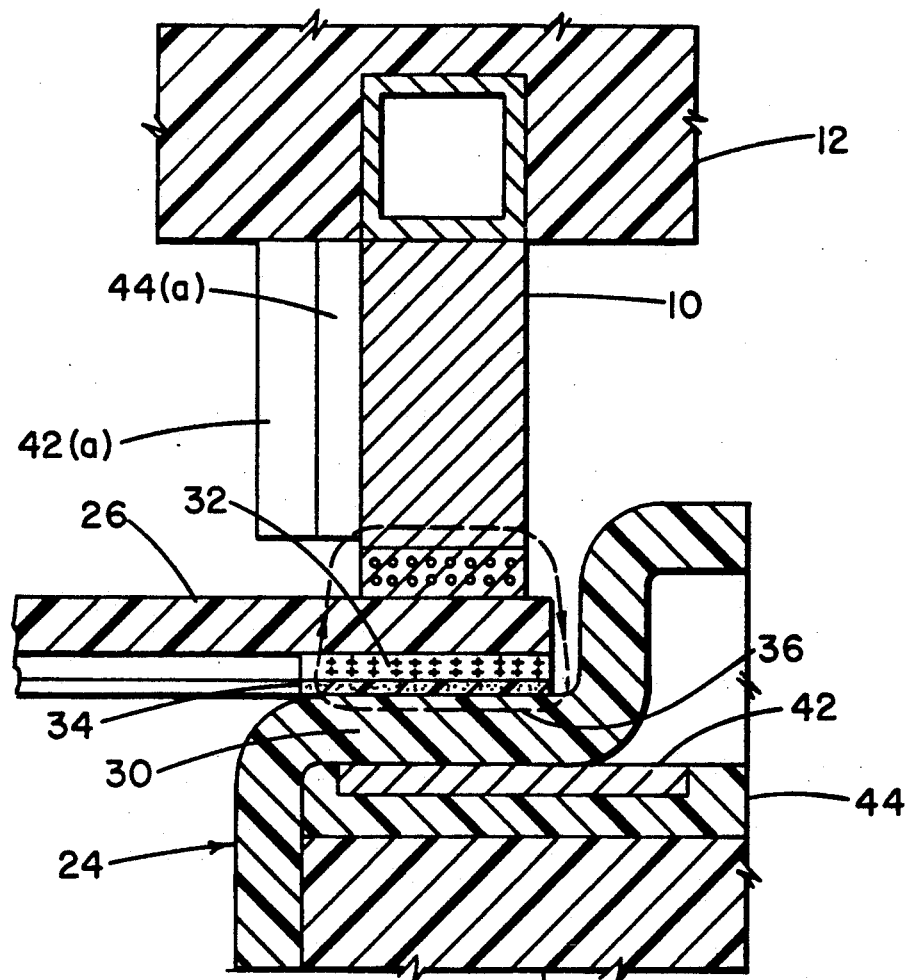
FIG. 2A is an enlarged cross sectional view also taken along lines 2—2 in FIG. 1 and showing the actual sealing operation.
Figure 3:
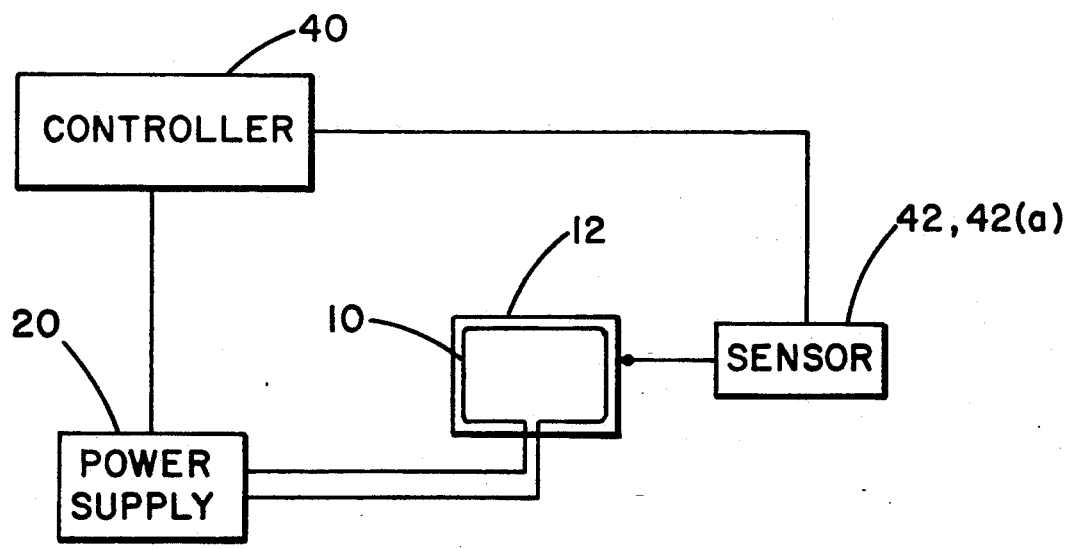
FIG. 3 is a schematic view of the principal elements supplying power to and controlling the current through the inductor seen in FIGS. 1 and 2.

A power supply 20 delivers electrical current to the inductor 10. In operation, food packages are brought into close proximity with the inductor 10, as seen in FIG. 2 and 2A, the inductor is energized achieving the seal and the sealed product package removed. This cycle is performed repeatedly and quickly to seal packages in a automated production line.

As can be best seen in FIGS. 2 and 2A, a product assembly to be sealed A comprises a product, such as a food product 22 contained in a tray-like package 24 with a closure or lid 26 disposed on top of the package. This product assembly A is assembled and supported in a product support 28 prior to the assembly A being brought into proximity with the sealing inductor 10.

The package 24 is provided with a horizontally extending flange 30 which extends around the periphery of the tray-like package and upon which the outer periphery of the closure or lid 26 rests. The package 24 and the closure 26 are both fabricated from materials selected to accommodate the food manufacturer. Various polymer materials are selected to achieve different results and contain different types of food for different consumer preferences. Induction heat sealing techniques can be modified to accommodate most packaging materials of choice.

As can best be seen in FIG. 2A, closure or lid 26 is provided with a band of aluminum 32 around its periphery. This band of aluminum is a continuous band and overlays a portion of the area wherein the closure or lid 26 rests upon the flange 30. The aluminum band 32 can be adhesively bonded to the closure or lid 26, printed onto the closure or lid 26 or affixed to the closure or lid 26 in any other manner. A layer of plastic or adhesive material 34 is applied on the side of the aluminum band 32 opposite from the closure or lid 26. The aluminum band is thereby sandwiched between two non-metallic layers 26 and 34.

Closure or lid 26 is sealed to the tray-like package 24 when an electric current is passed through the inductor 10. The electric current creates a magnetic field 36 shown schematically in FIG. 2A which in turn induces an electric current shown schematically with crosses in the aluminum band 32. The aluminum band is heated by the action of this current and the plastic or adhesive band 34 melts sufficiently to bond to the flange 30.

Figure 4:
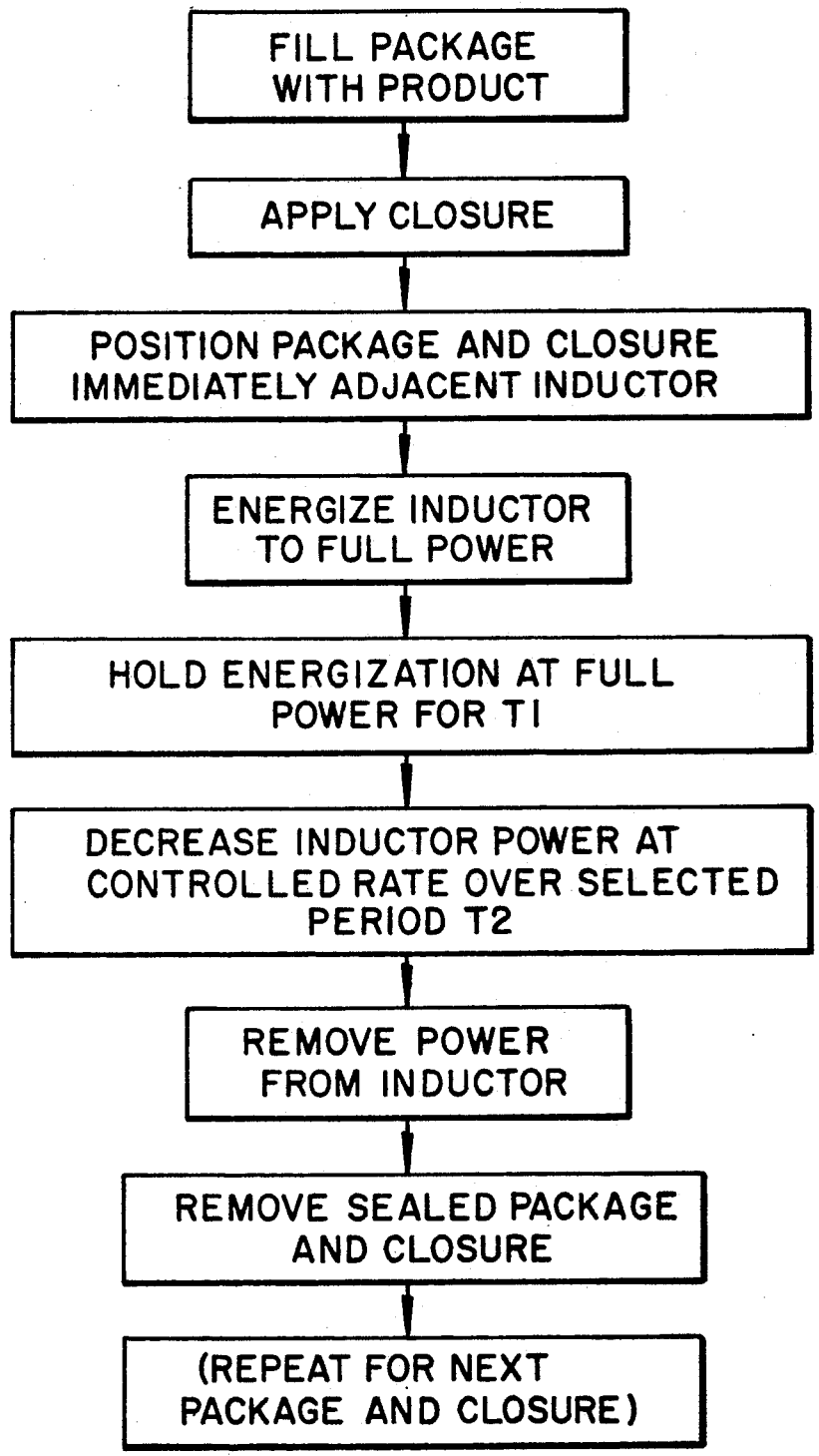
FIG. 4 is a graphical depiction of the method of employing the elements seen in FIGS. 1 through 3.
Figure 5:
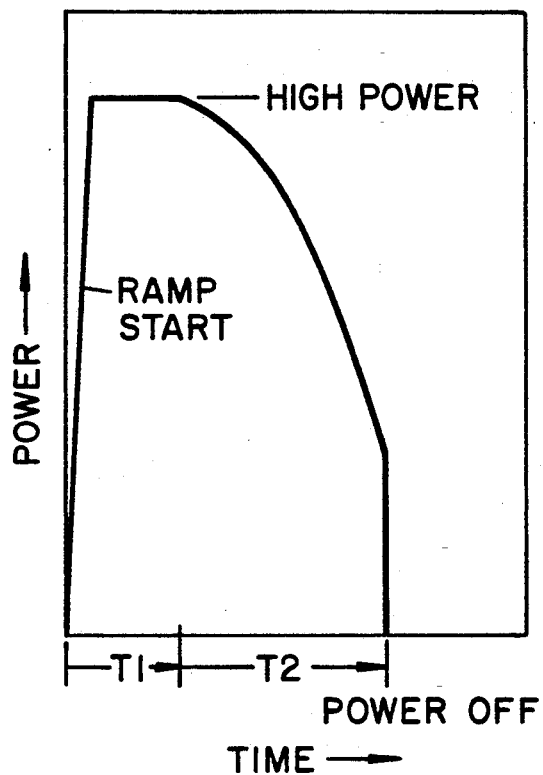
FIG. 5 is a graphical depiction of the electrical power supplied to the inductor shown in FIGS. 1 through 3; and, FIG. 6 is a graphical depiction of the temporal temperature profile achieved in the sealing zone during a cycle of the apparatus and method of the present invention.
Figure 6:
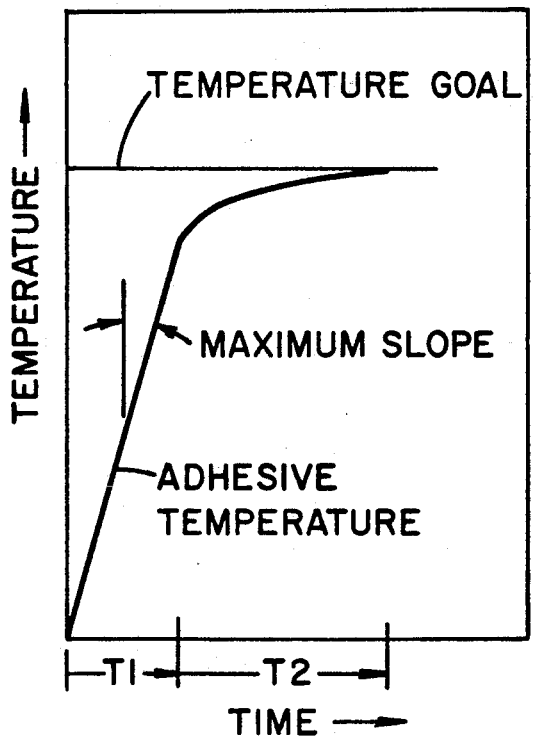

The steps of energizing the inductor to achieve the uniform bond are graphically described as FIGS. 4, 5 and 6. The inductor 10 is only energized after a package is brought in contact with the inductor. The inductor is then provided with full power. FIG. 5 shows a short ramp time, which is negligible, required for the inductor to achieve full power. Full power is held for a period T1 during which time the band of plastic or adhesive material is rapidly heated. As can be seen in FIG. 6 which illustrates the temperature of the band 34 of plastic or adhesive, the temperature rises quickly to a large fraction of the desired temperature goal. At the end of the selected time interval T1, the power supplied to the inductor 10 is gradually reduced over a selected time period T2. The temperature of the adhesive or plastic band 34 continues to increase but at a much slower controlled rate. The temperature slowly approaches a selected temperature goal asymtotic-like manner. The approach is usually not a true asymtotic curve as the goal is reached. The temperature goal selected is dependent on the materials selected for the plastic band 34, package 24 and closure 26. A major portion of the energy needed to soften the adhesive or plastic band 34 is supplied to the band while the band is still at low temperature during interval T1. The remaining energy needed to achieve a bond is applied in a more controlled slower manner during the time interval T2. Because of this, hot spots around the periphery of the band 34 are minimized, cold spots are also minimized and a more uniform temperature around the band is achieved. A uniform temperature close to the temperature goal achieves a more uniform seal and thus improves quality, consistency and reliability.

At the end of the interval T2, power is removed from the inductor 10, the sealed package and closure is disengaged from the inductor and the cycle starts again for the next product assembly A.

Control of the power delivered to the inductor 10 by the power supply 20 is achieved by a controller 40. The controller 40 can be a preset programmable controller which repetitively applies power in accordance with the timed sequence displayed in FIG. 5 on an automatic basis. Alternatively, the controller 40 can be a feedback controller relying upon information from a sensor 42. The sensor 42 monitors the temperature at or near the band of plastic or adhesive material 34. Various types of sensors are available. A contact sensor can be disposed in the product support 28 with an insulating layer 44 between the sensor and the support 28. The sensor 42 reads only the temperature of the flange 30 and is protected from the mass of the support 28 by the insulating body.

Alternatively, the sensor 42(a) can be an infrared detector or the like placed in close proximity to a shielded portion of the inductor 10. Again, an insulating shield 44(a) is positioned between the inductor 10 and the sensor 42. The sensor 42(a) then reads the temperature of the top of the lid 26 in the area of the band of an aluminum material 32. The areas being read by the sensor 42 are closely adjacent to the area in which the bond between the layer 34 and the flange 30 is being created. An appropriate temperature reading offset to account for the distance from the seal is programmed into the controller 40. The controller 40 then maintains high power in the period T1 without reference to the sensor 42 output. At the end of period T1, the controller shifts to a feedback mode and controls the power in accordance with a comparison of the temperature goal to the temperature reading from the sensor 42 and a selected offset. As the temperature reading from the sensor 42 starts to climb, the controller reduces the power output as shown in period T2 of FIG. 5 under feedback control. At the end of period T2 the controller stops all power to the inductor 10. The sealed package assembly A is removed and the cycle repeats for the next product assembly.

The invention has been described with reference to a preferred embodiment. Obviously, modifications and alterations will occur to others upon the reading and understanding of the specification. For instance, the two time interval inductive heating concept described can be used to control the induction heating of steel parts requiring hardening, annealing, brazing, tempering or the like. It is intended to include all such modifications and alterations insofar as they come within the scope of the appended claims or the equivalence thereof.

Having thus described the invention, it is claimed:

1. A method of sealing a package comprising the following steps:
   providing a package containing a product with an opening having a periphery, a closure having a periphery adapted to close said opening; and a conductive band of electrically conductive material in one of said package and closure, said conductive band being positioned generally adjacent said periphery of said package or closure;
   positioning said closure in said opening to form a package and closure assembly;
   positioning said package and closure assembly adjacent an inductor adapted to induce electrical current in said conductive band;
   energizing said inductor to a first selected power level whereby an electric current is induced in said conductive band generating heat;
   maintaining energization of said inductor at said first selected power level for a first selected time period to heat said conductive band to a first temperature;
   reducing said power level from said first selected power level to a second selected power level over a second selected time period to heat said conductive band to a second temperature wherein said second temperature is higher than said first temperature; and,
   deenergizing said coil.

2. The method of claim 1 wherein said second selected time period is longer than said first selected time period.

3. The method of claim 1 wherein said inductor is energized to achieve heating adjacent said conductive band to achieve a selected temporal temperature profile, said profile comprising a first temperature profile portion wherein temperature adjacent said conductive band rises rapidly and a second temperature profile portion wherein said temperature adjacent said conductive band rises less rapidly and asymtotically approaches a temperature goal.

4. The method of claim 3 wherein said first temperature profile portion is contemporaneous with said first selected time period and said second temperature profile portion is contemporaneous with said second selected time period.

5. The method of claim 4 wherein said temperature adjacent said conductive band rises at a generally constant rate during said first temperature profile portion.

6. The method of claim 5 wherein said constant temperature rise rate is selected to be the maximum rate at which said conductive band can be inductively heated.

7. The method of claim 1 including the step of monitoring the temperature of said package and closure adjacent said band and controlling said power level in said second selected time period with a controller responsive to said monitored temperature.

8. An apparatus for sealing a package comprising:
   positioning means holding said package in a desire location;
   closure application means including a conductive band for applying a closure to said package;
   an inductor adapted to induce an electrical current in said conductive band and heat said package and closure adjacent said conductive band;
   a power supply adapted to provide electrical energy to said inductor; and,
   a controller causing said power supply to deliver electrical energy to said inductor at a first high selected power level for a first selected time period and reducing said power level from said first selected power level to a second selected power level over a second selected time period.

9. The apparatus of claim 8 additionally comprising a sensor adapted to monitor the temperature of said package and said closure adjacent said conductive band, said controller being responsive to said monitored temperature in said second selected time period.

10. The apparatus of claim 8 wherein said second selected power level is not zero.

11. The apparatus of claim 8 wherein said controller is adapted to provide a temporal temperature profile comprising a first temperature profile portion wherein temperature adjacent said conductive band rises rapidly and a second temperature profile portion wherein temperature adjacent said conductive band asymtotically approaches a temperature goal.

12. An induction heating apparatus for heating a number of similar workpieces in repetitive cycles comprising:

an inductor;

means positioning a workpiece including a work zone to be located adjacent said inductor;

a power supply providing electrical energy to said inductor whereby an electrical current is induced in said workpiece; and, a power supply controller causing said power supply to deliver electrical energy to said inductor at a first high selected power level for a first selected time period, heating said work zone to a first temperature and reducing said power level from said first selected power level to a second selected power level over a second selected time period, wherein said target temperature is greater than said first temperature; wherein the power level profile during said second time period forms a concave negative slope which asymtotically approaches said second power level.

13. The apparatus of claim 12 additionally comprising a sensor adapted to monitor the temperature of said workpiece at said work zone, said controller reducing said power supply to said work zone as said monitored temperature asymtotically approaches a target temperature during said second selected time period.

14. The apparatus of claim 12 wherein said second selected power level is not zero.

15. The apparatus of claim 12 wherein said controller is adapted to provide a temporal temperature profile comprising a first temperature profile portion wherein workpiece work zone temperature rises rapidly and a second temperature profile portion wherein said workpiece work zone temperature asymtotically approaches a temperature goal.

16. A method of heating a work zone in a number of similar workpieces in repetitive cycles comprising the following steps:

providing an inductor adapted to induce electrical currents in said work zone;

positioning a workpiece adjacent said inductor;

energizing said inductor to a first selected power level whereby an electric current is induced in said work zone generating heat;

maintaining energization of said inductor at said first selected power level for a first selected time period heating said work zone to a first temperature;

reducing said power level from said first selected power level to a second selected power level over a second selected time period heating said work zone to a target temperature wherein said target temperature is higher than said first temperature and wherein the power level profile during said second time period forms a negative concave scope which asymtotically approaches said second power level; and, deenergizing said coil.

17. The method of claim 16 wherein said second selected time period is longer than said first selected time period.

18. The method of claim 16 wherein said inductor is energized to achieve heating in said work zone in a selected temporal temperature profile, said profile comprising a first temperature profile portion wherein work zone temperature rises rapidly and a second temperature profile portion wherein said work zone temperature asymtotically approaches a temperature goal.

19. The method of claim 18 wherein said first temperature profile portion is contemporaneous with said first selected time period and said second temperature profile portion is contemporaneous with said second selected time period.

20. The method of claim 19 wherein said work zone temperature rises at a generally constant rate during said first temperature profile portion.

21. The method of claim 20 wherein said constant temperature rise rate is selected to be the maximum rate at which said inductor can heat said work zone.

22. The method of claim 16 including the step of monitoring the temperature of said work zone and reducing said power level in said second selected time period with a controller as said monitored temperature asymtotically approaches a target temperature.

* * * * *